(12) United States Patent
Baba

(10) Patent No.: US 11,704,082 B2
(45) Date of Patent: Jul. 18, 2023

(54) PRINT SERVER GENERATING IMAGE DATA AFTER IMAGE PROCESSING IN ACCORDANCE WITH PRINT SHEET ORIENTATION OF PAPER FEED SOURCE

(71) Applicant: KYOCERA Document Solutions Inc., Osaka (JP)

(72) Inventor: Masaki Baba, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/510,654

(22) Filed: Oct. 26, 2021

(65) Prior Publication Data

US 2022/0137907 A1 May 5, 2022

(30) Foreign Application Priority Data

Oct. 29, 2020 (JP) .................................. 2020-181157

(51) Int. Cl.
*G06F 3/12* (2006.01)

(52) U.S. Cl.
CPC .......... *G06F 3/1286* (2013.01); *G06F 3/1211* (2013.01); *G06F 3/1252* (2013.01); *G06F 3/1253* (2013.01)

(58) Field of Classification Search
None
See application file for complete search history.

(56) References Cited

U.S. PATENT DOCUMENTS

| 2018/0174004 A1* | 6/2018 | Kaneda | .............. H04N 1/00915 |
| 2020/0133591 A1* | 4/2020 | Kaneda | ................... G06F 3/122 |

FOREIGN PATENT DOCUMENTS

JP 2019-197244 11/2019

\* cited by examiner

*Primary Examiner* — Andrew H Lam
(74) *Attorney, Agent, or Firm* — Lex IP Meister, PLLC

(57) ABSTRACT

An image forming system includes: an image forming apparatus having a priority paper feed source setting function and a print server that executes predetermined image processing, transmits image data after the image processing to the image forming apparatus, and causes the image forming apparatus to print an image based on the image data after the image processing. The print server (a) acquires a setting value of a priority paper feed source setting from the image forming apparatus, (b) specifies a print sheet orientation of a paper feed source designated as a priority paper feed source based on the acquired setting value, and (c) generates the image data after the image processing by matching an orientation of the image based on the image data after the image processing with an orientation corresponding to the specified print sheet orientation.

4 Claims, 2 Drawing Sheets

PRINT SERVER GENERATING IMAGE DATA AFTER IMAGE PROCESSING IN ACCORDANCE WITH PRINT SHEET ORIENTATION OF PAPER FEED SOURCE

INCORPORATION BY REFERENCE

This application is based upon and claims the benefit of priority from the corresponding Japanese Patent Application No. 2020-181157 filed on Oct. 29, 2020, the entire contents of which are incorporated herein by reference.

BACKGROUND

The present disclosure relates to an image forming system and a print server.

In an image forming system, a print server such as a fiery server performs predetermined image processing such as rasterizing processing and halftone processing in place of an image forming apparatus (a printer, a multifunction peripheral, or the like) and transmits the image data after image processing to the image forming apparatus, and the image forming apparatus receives the image data, executes printing based on the received image data without executing the image processing, and outputs a print product.

SUMMARY

According to an embodiment of the present disclosure, there is provided an image forming system comprising: an image forming apparatus having a priority paper feed source setting function and a print server configured to execute predetermined image processing, transmit image data after image processing to the image forming apparatus, and cause the image forming apparatus to print an image based on the image data after image processing. Then, the print server (a) acquires a setting value of a priority paper feed source setting from the image forming apparatus, (b) specifies a print sheet orientation of a paper feed source designated as the priority paper feed source based on the acquired setting value, and (c) generates the image data after the image processing by matching an orientation of the image based on the image data after the image processing with the orientation corresponding to the specified print sheet orientation. The image forming apparatus (a) receives the image data after the image processing from the print server, and (b) prints an image based on the image data after the image processing on a print sheet of a paper feed source designated as the priority paper feed source.

DETAILED DESCRIPTION

Hereinafter, an embodiment of the present disclosure will be described with reference to the drawings.

Figure 1:
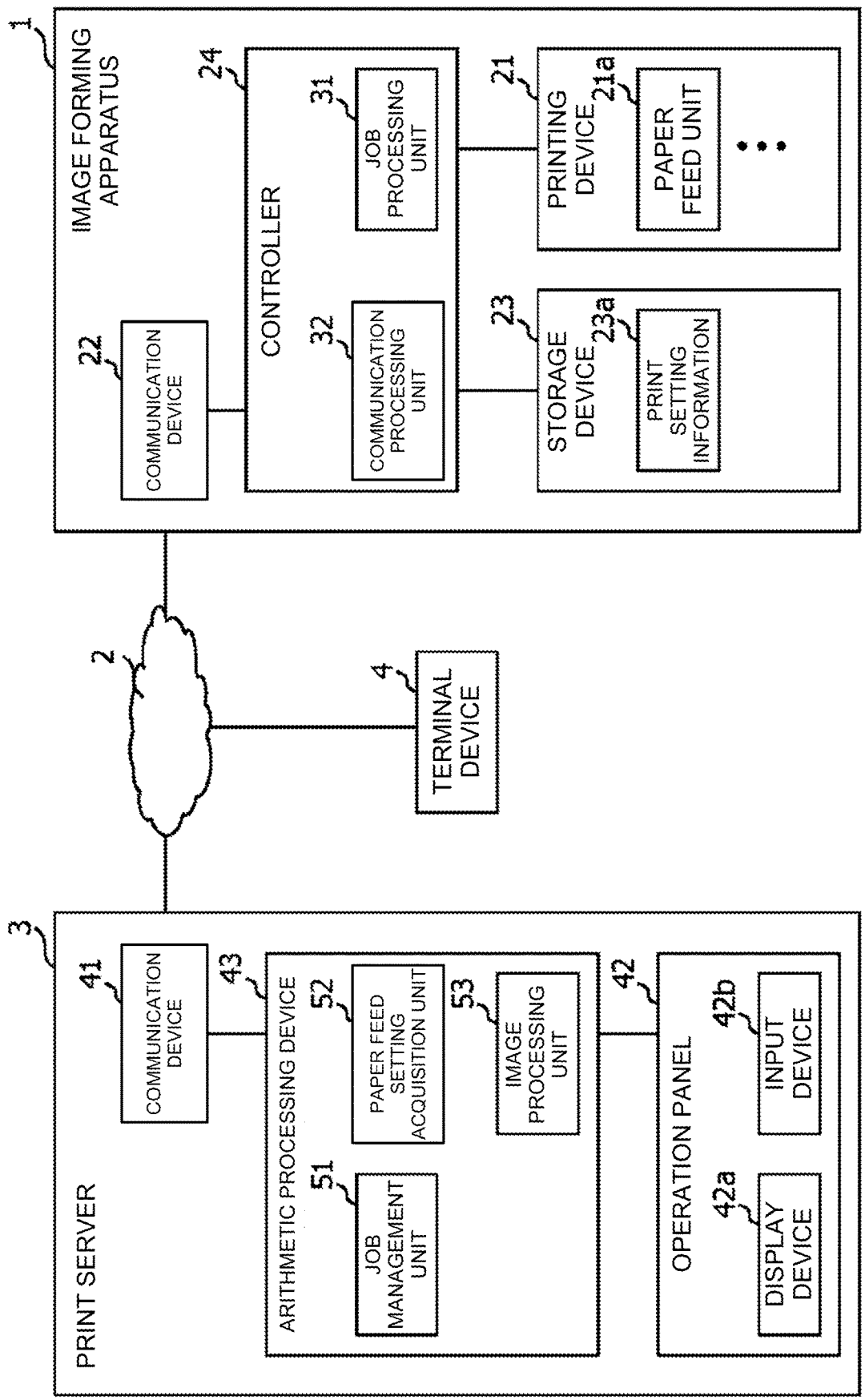
FIG. 1 is a block diagram illustrating a configuration of an image forming system according to an embodiment of the present disclosure.

FIG. 1 is a block diagram illustrating a configuration of an image forming system according to an embodiment of the present disclosure.

The system shown in FIG. 1 includes an image forming apparatus 1, a print server 3 connected to the image forming apparatus 1 via a network 2 such as LAN (local area network), and a terminal device 4.

The image forming apparatus 1 is an apparatus having a print function such as a printer or a multifunction peripheral, and includes a plurality of paper feed sources (a paper feed unit 21a such as a paper feed tray). The image forming apparatus 1 has a priority paper feed source setting function, and feeds and conveys print sheet of a paper feed source selected by a user or automatically set from a plurality of paper feed sources, and uses the print sheet for printing.

The print server 3 is a digital front end that executes predetermined image processing (rasterizing processing, halftone processing, etc.), transmits the image data after image processing to the image forming apparatus 1 via the network 2, and causes image forming apparatus 1 to print an image based on the image data after image processing.

The image forming apparatus 1 includes an image processing unit that performs the above-described predetermined image processing (rasterization processing, halftone processing, and the like), and the image forming apparatus 1, when receiving image data after image processing from the print server 3, executes image printing based on the image data after the image processing without executing the image processing.

The print server 3 executes the above-described image processing by an arithmetic processing device faster than an arithmetic processing device capable of executing the above-described image processing in the image forming apparatus 1. Therefore, when the above-described image processing is executed by the print server 3 instead of the image forming apparatus 1, print processing (image processing necessary for printing and printing) is executed in a short time.

The terminal device 4 is a portable terminal device such as a smartphone, a personal computer, or the like, and can transmit a print request to the print server 3.

The image forming apparatus 1 includes a printing device 21, a communication device 22, a storage device 23, and a controller 24.

The printing device 21 prints an image on a print sheet by a built-in print engine of a predetermined printing system such as an electrophotographic system. The printing device 21 includes a plurality of paper feed units 21a that can be designated as paper feed sources of print sheet used for printing. That is, the printing device 21 feeds and conveys the print sheet in the paper feed unit 21a selected from the plurality of paper feed units 21a, and prints an image on the print sheet by the print engine.

The communication device 22 is, for example, a network interface connected to the network 2, and is a circuit that performs data communication with another device (such as the print server 3) connected to the network 2.

The storage device 23 is a device capable of storing various data and programs. As the storage device 23, a nonvolatile large-capacity storage medium such as a nonvolatile memory or a hard disk drive is used. The storage device 23 stores print setting data 23a. The print setting data 23a includes current setting values of various setting items of the printing device 21 and includes setting values of the priority paper feed source setting.

The controller 24 includes a job processing unit 31 and a communication processing unit 32. The controller 24 includes an arithmetic processing device such as a computer and/or a ASIC (Application Specific Integrated Circuit), and operates as a job processing unit 31 and a communication processing unit 32 by executing software processing and/or hardware processing in the arithmetic processing unit. The computer includes a CPU (Central Processing Unit), ROM (Read Only Memory), a RAM (Random Access Memory) and the like, loads a program from a ROM, a storage device 23 and the like into a RAM, and executes the program by a CPU to execute software processing.

Upon receiving the image data after image processing from the print server 3, the job processing unit 31 controls the printing device 21 to print an image based on the image data. During this process, the printing device 21 uses the print sheet of the paper feed unit 21a corresponding to the setting value of the priority paper feed source setting for printing.

The communication processing unit 32 performs data communication with the print server 3 or the like using the communication device 22 according to a predetermined communication protocol.

For example, the communication processing unit 32 discloses the setting value of the priority paper feed source setting in the print setting data 23a as a SNMP (Simple Network Management Protocol) MIB (Management Information Base) object, and transmits the setting value of the priority paper feed source setting as an MIB object in response to a request according to SNMP.

The print server 3 includes a communication device 41, an operation panel 42, and an arithmetic processing device 43.

The communication device 41 is, for example, a network interface connected to the network 2, and is a circuit that performs data communication with another device (image forming apparatus 1, the terminal device 4, or the like) connected to the network 2.

The operation panel 42 is disposed on the front face of the housing of the print server 3, and includes a display device 42a for displaying various information to the user and an input device 42b for detecting a user operation. As the display device 42a, for example, a liquid crystal display is used. As the input device 42b, a hard key, a touch panel, or the like is used.

The arithmetic processing device 43 includes an arithmetic processing unit such as a computer and/or an ASIC, and operates as a job management unit 51, a paper feed setting acquisition unit 52, and an image processing unit 53 by executing software processing and/or hardware processing in the arithmetic processing unit.

The job management unit 51 receives a print request (a print request based on a user operation on the operation panel 42, a print request received from the terminal device 4, or the like), and transmits the image data of the target image after the predetermined image processing by the image processing unit 53 to the image forming apparatus 1 designated by the print request using the communication device 41 based on the target image and the setting information designated by the print request.

In the case of a print request based on a user operation on the operation panel 42, the job management unit 51 uses the communication device 41 or a peripheral device interface (not shown) to acquire target image data (data described in a page description language, or the like) from a server on the network 2 designated by the user operation or a portable storage such as a USB memory designated by the user operation.

The paper feed setting acquisition unit 52 acquires the setting value of the priority paper feed source setting from the image forming apparatus 1 via the network 2.

The paper feed setting acquisition unit 52 acquires the setting value of the priority paper feed source setting from the image forming apparatus 1 when a specific paper feed source in the image forming apparatus 1 is not specified in the paper feed source setting in the print request, and does not acquire the setting value of the priority paper feed source setting from the image forming apparatus 1 when a specific paper feed source in the image forming apparatus 1 is specified in the paper feed source setting in the print request.

In this embodiment, the setting value of the priority paper feed source setting is disclosed as a MIB object of SNMP in the image forming apparatus 1, and the paper feed setting acquisition unit 52 acquires the setting value of the priority paper feed source setting from the image forming apparatus 1 using SNMP.

The image processing unit 53 executes predetermined image processing (halftone processing or the like) instead of the image forming apparatus 1.

Further, the image processing unit 53 specifies the print sheet orientation of the paper feed source designated as the priority paper feed source based on the setting value acquired from the image forming apparatus 1, and generates image data after image processing, with the orientation of the image based on the image data after image processing corresponding to the orientation corresponding to the specified print sheet orientation.

When a specific paper feed source in image forming apparatus 1 is specified in the paper feed source setting in the print request, the image processing unit 53 specifies the print sheet orientation of the paper feed source specified in the paper feed source setting in the print request, and generates the image data after image processing by matching the orientation of the image based on the image data after image processing with the orientation corresponding to the specified print sheet orientation.

In this embodiment, the image processing unit 53 rotates the image so that the orientation of the image based on the image data after the image processing corresponds to the specified print sheet orientation, and executes the above-described image processing after the image rotation.

Note that the image processing unit 53 may be configured to be capable of performing rasterization processing, generate raster image data of a target image from a print request described in a page description language, and perform the above-described image rotation and image processing on the raster image data.

In a non-volatile storage device (not shown) in the print server 3, information on the paper feed unit 21a of the image forming apparatus 1 (an identifier for each paper feed unit 21a, a size and an orientation of a sheet to be accommodated, and the like) is installed in advance, and the image processing unit 53 refers to this information to specify the paper size and the paper orientation of the paper feed unit 21a of the image forming apparatus 1.

Figure 2:
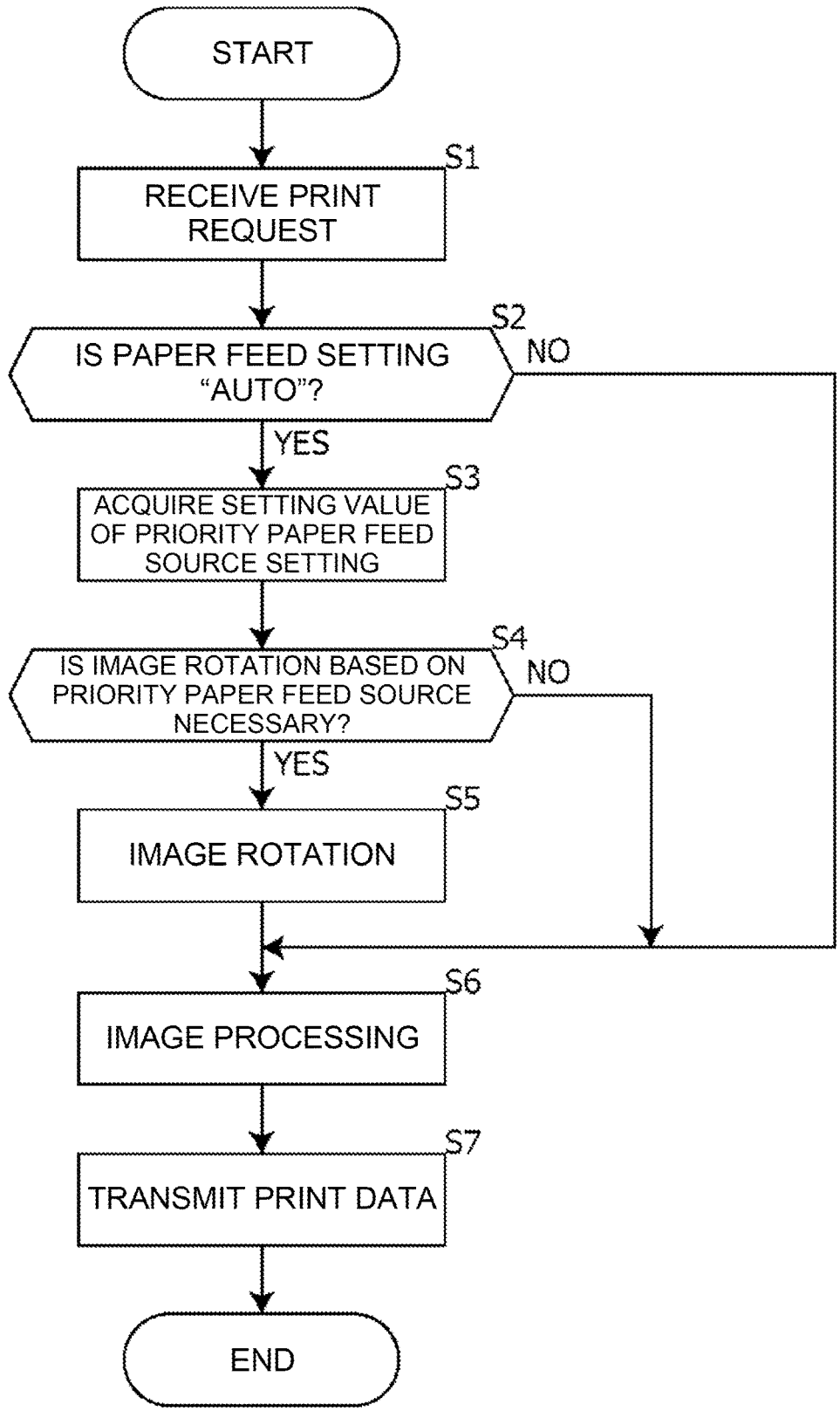
FIG. 2 is a flowchart illustrating the operation of the print server 3 in FIG. 1.

Next, the operation of the system will be described. FIG. 2 is a flowchart illustrating the operation of the print server 3 in FIG. 1.

In the print server 3, when receiving a print request based on a user operation on the operation panel 42 or a print request received from the terminal device 4 (step S1), the job management unit 51 determines whether the paper feed source setting in the print request is "auto" (step S2).

When the paper feed source setting in the print request is "auto" (that is, when the specific paper feed source in the image forming apparatus 1 is not designated), the job management unit 51 causes the paper feed setting acquisition unit 52 to acquire the setting value of the priority paper feed source setting. Therefore, when the paper feed source setting in the print request is "auto", the paper feed setting acquisition unit 52 acquires the setting value of the priority paper feed source setting from the image forming apparatus 1 (step S3).

The job management unit 51 specifies the print sheet orientation of the paper feed unit 21a specified in the priority paper feed source setting of the image forming apparatus 1 based on the acquired setting value, and determines whether image rotation of the target image is necessary based on the print sheet orientation and the orientation of the target image (step S4).

When it is determined that the image rotation of the target image is necessary, the job management unit 51 executes the image rotation and predetermined image processing (halftone processing or the like). Therefore, in this case, the image processing unit 53 executes image rotation (image rotation by 90 degrees or 270 degrees) of the target image (step S5), and then executes predetermined image processing on the rotated target image (step S6).

On the other hand, in the case where the specific paper feed source in image forming apparatus 1 is designated in the paper feed source setting in the above-described print request, image processing is executed (step S6) without executing processing (processing of step S3 to S5) such as acquisition of the setting value of the priority paper feed source setting.

If it is determined in step S4 that image rotation of the target image is not necessary, image processing is executed without executing image rotation (step S6).

When the image processing is completed, the job management unit 51 transmits the image data after image processing to the image forming apparatus 1 using the communication device 41 (step S7).

The image forming apparatus 1, when the communication processing unit 32 receives the image, the job processing unit 31 causes the printing device 21 to print an image based on the image data without performing image rotation or image processing on the image data.

As described above, according to the above-described embodiment, the print server 3 (a) acquires a setting value of a priority paper feed source setting from the image forming apparatus 1, (b) specifies a print sheet orientation of a paper feed source designated as a priority paper feed source based on the acquired setting value, and (c) generates the image data after the image processing by matching an orientation of the image based on the image data after the image processing with an orientation corresponding to the specified print sheet orientation, and the image forming apparatus 1 (a) receives the image data after the image processing from the print server 3, and (b) prints the image based on the image data after the image processing on a print sheet of the paper feed source designated as the priority paper feed source.

Accordingly, even if a specific paper feed source is not specified by the user and there is a possibility that the paper feed source that actually feeds the print sheet used for printing may be dynamically changed by the priority paper feed source setting function, the paper feed source that is actually used at the present time is specified by the print server 3. Therefore, an error end due to the priority paper feed source setting is suppressed.

Various changes and modifications to the above-described embodiments will be apparent to those skilled in the art. Such changes and modifications may be made without departing from the spirit and scope of the subject matter and without diminishing its intended advantages. It is therefore intended that such changes and modifications be covered by the appended claims.

The present disclosure is applicable to, for example, a print server as a digital front end.

What is claimed is:

1. A print server that executes predetermined image processing, transmits image data after the image processing to an image forming apparatus, and causes the image forming apparatus to print an image based on the image data after the image processing, the print server comprising:
   a paper feed setting acquisition unit to acquire a setting value of a priority paper feed source setting from the image forming apparatus; and
   an image processing unit to specify a print sheet orientation of a paper feed source designated as a priority paper feed source based on the acquired setting value, and generate the image data after the image processing by matching an orientation of the image based on the image data after the image processing with an orientation corresponding to the specified print sheet orientation,
   wherein the paper feed setting acquisition unit acquires the setting value of the priority paper feed source setting from the image forming apparatus when a specific paper feed source in the image forming apparatus is not designated in the paper feed source setting in a print request, and does not acquire the setting value of the priority paper feed source setting from the image forming apparatus when the specific paper feed source in the image forming apparatus is designated in the paper feed source setting in the print request, and
   wherein when the specific paper feed source in the image forming apparatus is designated in the paper feed source setting in the print request, the image processing unit specifies the print sheet orientation of the paper feed source specified in the paper feed source setting in the print request and generates the image data after the image processing by matching an orientation of the image based on the image data after the image processing with an orientation corresponding to the specified print sheet orientation.

2. The print server according to claim 1,
   wherein the image processing unit performs an image rotation such that the orientation of the image based on the image data after the image processing is the orientation corresponding to the specified print sheet orientation, and executes the image processing after the image rotation.

3. A print server that executes predetermined image processing, transmits image data after the image processing to an image forming apparatus, and causes the image forming apparatus to print an image based on the image data after the image processing, the print server comprising:
   a paper feed setting acquisition unit to acquire a setting value of a priority paper feed source setting from the image forming apparatus; and
   an image processing unit to specify a print sheet orientation of a paper feed source designated as a priority paper feed source based on the acquired setting value, and generate the image data after the image processing by matching an orientation of the image based on the image data after the image processing with an orientation corresponding to the specified print sheet orientation,
   wherein the setting value of the priority paper feed source setting is disclosed as a MIB object of SNMP in the image forming apparatus, and the paper feed setting acquisition unit acquires the setting value of the priority paper feed source setting from the image forming apparatus using SNMP.

4. The print server according to claim 3,
wherein the image processing unit performs an image rotation such that the orientation of the image based on the image data after the image processing is the orientation corresponding to the specified print sheet orientation, and executes the image processing after the image rotation.

\* \* \* \* \*